March 17, 1970 M. W. GAUMER 3,501,064
LIQUID SAMPLE DISPENSING MEANS
Filed Oct. 20, 1967

INVENTOR.
Marvin W. Gaumer
BY
Daniel P. Levinson
ATTORNEY.

United States Patent Office 3,501,064
Patented Mar. 17, 1970

3,501,064
LIQUID SAMPLE DISPENSING MEANS
Marvin W. Gaumer, Ridgefield, Conn., assignor to The Perkin-Elmer Corporation, Norwalk, Conn., a corporation of New York
Filed Oct. 20, 1967, Ser. No. 676,784
Int. Cl. G01f 11/10
U.S. Cl. 222—358        3 Claims

ABSTRACT OF THE DISCLOSURE

This concerns an improved hollow probe for dispensing liquid samples, which probe moves into two positions, namely, a sample-engaging and a raised, sample-free position. The tip of the probe is curved or bent so that the plane of the orifice is horizontal when the probe is in the up, sample-free position, thereby substantially, eliminating any tendency to drip. The interior of the probe tip is both smooth and substantially untapered near the orifice to avoid both air bubble formation and sample drop entrapment. Elimination of air bubble formation avoids errors in dispensing or sucking up measured quantities of sample; while avoiding sample drop entrapment is particularly important when the probe is used first to suck up some liquid sample and then discharge it plus a measured amount of additional solvent, in order to avoid errors in the dilution ratio.

THE INVENTION

Figure 1:
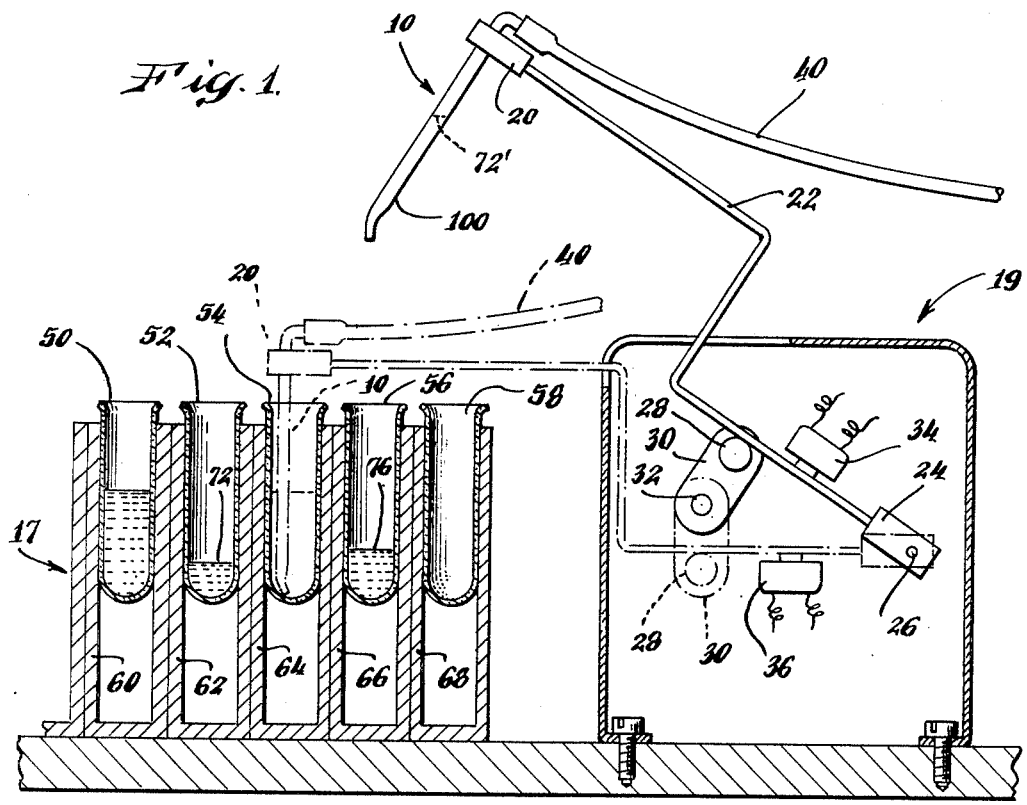

This invention relates to a system for supplying specific quantities of liquid sample, and in particular the part thereof which dispenses the liquid sample.

In certain types of liquid handling systems it is crucial that the amount of liquid dispensed by the final element (hereinafter referred to as the "sample probe") be exact (i.e., precisely repeatable). Examples of such systems include automated or partly automated systems for delivering a series of liquid samples to an analytical instrument. An example of such a system is disclosed in U.S. patent application Ser. No. 630,394, filed on Apr. 12, 1967 by Marvin W. Gaumer. A major source of error in maintaining constant the quantity of sample delivered is the undesired dripping of sample liquid material from the sample probe during those parts of the cycle in which no sample is intended to be delivered. In certain types of liquid sample dispensing systems (including one mode of operation of the apparatus disclosed in the aforementioned U.S. patent application) the problem is compounded by the fact that the original sample liquid is diluted before being delivered to the, say, analytical instrument. A typical such cycle would include the following steps:

(1) The sample probe is lowered into a sample container containing a quantity unmeasured) of original liquid sample, and a specific volume of original sample is withdrawn from the container (by the diluter applying suction);

(2) The sample probe is raised from the original sample container and out of the path thereof:

(3) The original sample container is moved and an empty second container is positioned in its place, generally below the sample probe;

(4) The sample probe is lowered into the empty container;

(5) The dilution system is caused to discharge a known predetermined volume of diluent through the sample probe, thereby also discharging the known aliquot amount of original liquid sample;

(6) The sample probe is raised from and out of the way of the second container, now containing diluted sample;

(7) The second diluted-sample container is moved, the next original (undiluted) sample container is put in its place, and the entire operation repeated.

Each "second" container (i.e., those containers which have been supplied with diluted liquid sample in the manner just described) may then be sequentially presented to the sample injection station of the analytical instrument. Typically the sample injection process will occur at a later station of some form of endless conveyor system for the various sample containers, so that the sample dilution and the sample injection processes may occur in a continuous manner. As may be readily seen, loss of even part of the original sample during the above dilution process (for example, at step (4) above) will cause errors in both the total amount of actual liquid sample analyzed and the final concentration of the diluted liquid sample. It should also be noted that the dilution technique presupposes that all of the original liquid sample in the tip of the sample probe is in fact pushed out of the probe by the diluent in step (6) above. If any of the original liquid sample remains entrapped in the sample probe, there will again be errors in both the total amount and concentration of the diluted sample actually analyzed.

The problem of avoiding loss (i.e., dripping from the probe tip) of original undiluted sample material (during step (2) above) is aggravated when the diluting probe is tilted when removed from the container. Such angling of the sample probe will normally occur if a simple pivotal movement is used (as for example in the apparatus disclosed in the above referred to U.S. patent application) to raise the probe from the sample container. The invention substantially eliminates any tendency for the tip of the sample probe to drip when it is in its raised or removed position, even though the probe is angled in this position relative to its used position (i.e., when it is within either the first or second container).

An object of the invention is the provision of an improved hollow sample probe for dispensing liquids, which probe substantially eliminates undesired loss of liquid sample material, even when the probe is tilted relative to its normal operative position.

A related object is the provision of such a dripless sample probe for use in an automatic liquid sampling system.

Another similar object is the provision of such a dripless sample probe particularly adapted for use in a liquid sampling system of the type in which a measured quantity of liquid sample is first drawn into the probe, and subsequently a quantity of diluent is caused to flush the measured quantity of the sample out through the tip of the probe.

A similar object is the provision of such a dripless sample probe for use in a sample dilution system, which sures that no liquid sample remains entrapped in the sample probe after discharge of the diluent.

Figure 2:
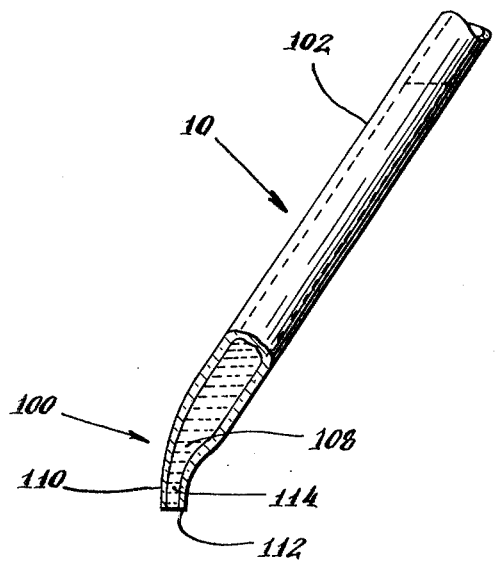

Other objects, features and advantages of the invention will become apparent to one skilled in the art upon reading the following detailed description of one embodiment of the invention in conjunction with the accompanying drawing, in which:

FIG. 1 is a vertical section showing a sample dispensing probe according to the invention and the immediately adjacent parts of an exemplary liquid sample supply and dilution system, showing the sample probe in its retracted position and (in dotted lines) in the sample container engaging position; and FIG. 2 is an enlarged elevation of the sample dispensing end of the probe of FIG. 1, also in its raised or retracted position.

Although the heart of the present invention concerns the sample or diluting probe 10, in order to understand the problems solved by the present invention, an understanding of the operation of the immediately adjacent parts of the liquid sampling system is necessary. Therefore such parts, shown in FIG. 1, are first described. It may be noted that the various parts shown in FIG. 1, except for the diluting probe 10 itself, may comprise the same dilution unit as shown (at 19) in FIGS. 1 and 3 of the aforementioned copending patent application, the details of which may be substantially identical as therein stated to the aspirating probe unit 18 (which details are shown in FIG. 4 of said application) except for their position relative to the sample conveying means (i.e., sample table 17 therein). Since the present invention may be utilized in any liquid sample supply system, none of the specific elements as shown in FIG. 1, except for the sample or diluting probe 10 itself, are considered important to the present invention. Such a sample dilution unit 19 may comprise a clamp 20 supporting the sample probe 10, being itself supported at the end of a bent rigid arm 22 which is pivotally connected at its other end (as by bearing block 24 pivotally surrounding a stationary pin 26). Elements 20–24 are reciprocated from their upper retracted position (shown in full lines in FIG. 1) to their lower position (shown in dotted line) so as to enter a sample container by any suitable arrangement, such as crank pin 28 carried by a crank arm 30, which arm is pivotally driven about an axle 32 (as by a motor, not shown). Upper and lower limit switches 34, 36 respectively, may cause de-energizing of the motor so as to alternately stop the bent rigid arm 22 in its upper and lower positions. Additional switches and wiring to the motor may be present so as to cause the motor to drive the arm toward one of the limit switches, as for example, more fully disclosed in said copending application. A flexible tube 40 is connected to the upper end of the bent sample probe 10, which flexible tubing is connected to a diluting unit, subsequently described. A sample conveying means, generally shown at 17, will cause a series of sample containers to pass to the location (occupied by sample container 54 in FIG. 1) in which they may be engaged by the sample or dilution probe 10 in its lowered position. For convenience of illustration it is assumed that each of the sample containers (50, 52, 54, 56 and 58) are supported, say, in individual holders (60, 62, 64, 66 and 68, respectively) which progress from right to left in FIG. 1. It will also be assumed that additional sample containers may move into the position occupied by sample container 58 and its holder 68 along a line essentially perpendicular to the paper so that an indefinite series of sample containers may be caused to pass beneath the sample probe 10.

For an exemplary diluting operation, alternate sample containers (e.g., container 54 and container 58) would be initially empty, and the other alternate series of containers (e.g., containers 52 and 56) would initially contain a relatively concentrated liquid sample (at 72, 76 respectively). Assume that the sample probe 10 has (first step, above) previously been inserted into the sample container 52 containing concentrated liquid sample 72, and has (by the application of a predetermined amount of suction as will be explained subsequently) sucked up a certain quantity of the original relatively concentrated liquid sample so as to be present at the lower part of probe 10 at at 72′. Operation of the motor driving crank arm 30 (second step) will then cause the bent arm 22 to be driven to the "up" position shown in dotted lines in FIG. 1; and each of the sample containers (50–58) and their supports (60–68) will have been moved (third step) one unit to the left in FIG. 1 so as to reach the position therein shown (this movement of course occurring while the sample assembly (elements 20–24) is in the retracted, "up" position). The next cycle of the motor (step (4)) driving crank arm 30 will cause it and the bent arm 22 to be moved to its lower position (shown in dotted line in FIG. 1) so that the probe 10 is introduced into the next, empty sample container 54. The diluent (e.g., water, an organic solvent or the like) already present not only in flexible tube 40 but the upper part of probe 10 is then put under pressure (step (5)) so as to cause a controllable amount of the diluent to flow into and through the lower part of probe 10, pushing the concentrated sample material 72 before it into the empty container 54. Thus the sample quantity sucked into the lower part of probe 10 during the previous (step (1)) operation will be discharged along with a predetermined amount of solvent into the originally empty container 54.

By controlling the amount of sample originally sucked up into the lower part of probe 10 (in step (1)) and the quantity of diluent discharged (during step (5)), both the dilution ratio and the total amount of diluted sample prepared may be varied. For example if the sample induction is caused by a metering suction pump that is adjustable between 0.1 and 1.0 milliliter, and the diluent discharge is controlled by a metering pressure pump which is adjustable between 1 and 10 milliliters of diluent, dilution ratios between 1:1 and essentially 100:1 may be obtained. Units having two such metering pumps intended for this general purpose are commercially available (for example, the Model 240 or Model 250 "diluter" of Fisher Scientific Company). It should be noted that the discharge of the diluent behind the sample material 72′ will cause a swirling and a mixing in the sample container (for example, 54) which is greatly assisted by the fact that the lower end (100) of the sample or diluent probe 10 is curved or offset relative to the main part of the probe, as will be more fully explained hereinafter.

After discharging the concentrated sample and predetermined amount of diluent, the probe and arm 22 will again be driven to the upper position (as shown in the solid line position in FIG. 1) by rotation of crank arm 30 (step (6)). The condition of the apparatus will differ from that shown in solid lines in FIG. 1, however, in that the entire probe 10 will of course be filled with pure diluent. While the arm 22 is again in its raised position, the containers and supports (50–58 and 60–68, respectively) will again be moved one unit to the left so as to bring the next container 56, holding a new concentrated liquid sample 76, into the position formerly occupied by container 54 (step (7)). After this final stage of the cycle, crank arm 30 will again turn so as to lower the arm and probe into this container 56, and then the suction metering pump of the diluting unit (not shown) will draw up an appropriate amount of sample 76 into the lower part of probe 10 (step (1)); thereafter (step (2)) crank arm 30 will again turn so as to raise the arm to the position shown in solid lines in FIG. 1, with a certain amount of a new concentrated liquid sample in the lower part of probe 10. After the containers have been moved once more to the left (step (3)) so as to place the next empty container (58) at the operative position (under the probe 10), the apparatus will then have reached the same point in a cycle (i.e., between steps (3) and (4)) as was the starting condition assumed at the beginning of this description of the operation.

During step (3) (i.e., the position shown in full lines in FIG. 1), any dripping of the contents of the sample probe 10 will cause loss of the concentrated original liquid sample material (e.g., at 72′) so as to change the total amount (and concentration) of sample delivered to the next empty container (e.g., 54). Further, if such dripping did occur, it may cause the undesirable mixing of one sample (e.g., part of 72′) with a different liquid sample (e.g., 76, see FIG. 1). It is therefore important that the sample probe 10 be as "dripless" as is possible. This is accomplished according to the invention by shaping the sample probe 10 in a manner best seen in the enlarged view thereof in FIG. 2.

In FIG. 2 approximately the lower half of probe 10 is shown generally at 100. This lower half of the probe starts as a continuation of the relatively thin-walled (at 102) open channel tube but has been both narrowed and bent at its lowermost end. Specifically the tubing has been stretched so as to gradually narrow at points below those in the vicinity indicated at 104; and this narrowed lowermost part has been gradually bent in the area below that indicated at 106. For this reason the internal channel in the probe at the very lowermost end narrows as indicated at 108, and the lowermost tip of the probe at 110 extends vertically downward when the general longitudinal axis of the entire probe 10 is at a substantial angle, as will occur in the normally retracted probe position of FIG. 1 (and indicated in FIG. 2). The gradual narrowing of the internal channel at points near and below 108, the vertical direction of this channel at the extreme tip 110 of the probe, and the resulting horizontal plane of the sample dispensing aperture 112 at the extreme probe tip assist in minimizing any tendency for the sample to drip from the lower end of the probe when it is in its angled retracted position. In particular the narrowness and verticality of the lowermost part 114 of the sample-dispensing channel substantially precludes the possibility of air bubble entry through the tip aperture 112. Stated in other terms, the surface tension of the liquid in the lowermost part of the channel 114, the narrowness of the channel, its substantial verticality, and the smallness of aperture 112 together substantially preclude any dripping of the liquid from the probe when it is in tilted, retracted position (i.e., as in FIGS. 1 and 2).

Additionally the gradual narrowing of the channel in the vicinity of 108 and the smoothness of the curve of the tubing 106 and 110 both reduces any turbulence and avoids the formation of any "pockets" where the sample material might become entrapped, thus assuring that the expulsion of the diluents (during step (5)) will necessarily discharge all of the sample material in the probe tip (i.e., none of the sample may be bypassed by the diluent). This fact not only insures that all of the measured liquid sample is transferred to the empty container (say, 54) during step (5), but also obviates any substantial contamination of one sample by any appreciable quantity of a residual, previous sample remaining in the probe.

Since the lowermost part of the channel (at 114) is vertical, and the sample dispensing aperture 112 is horizontal, there is no differential gravity effect on the substantially horizontal liquid surface, so as to inhibit air entry. When the probe is in its "up" position (as in FIG. 2, and in solid lines in FIG. 1), both the lowermost channel and the sample dispensing aperture (114 and 112, respectively) will necessarily be tilted when the probe is in its "down" position (broken line position in FIG. 1). This angled position during the step (5) sample discharge creates a certain amount of turbulence in the container (e.g., 54) so as to improve the mixing of the sample and diluent, and also assures that the probe aperture is not substantially blocked by the bottom surface of the container (the latter being important in the step (1) withdrawal of concentrated sample as well as in the discharge of step (5)).

The narrowest, lowermost channel (114) should have substantially the same diameter as the aperture (112) for a minimum length of at least about two and a half times this diameter. The preferred actual diameter (of both 112 and 114) will vary according to viscosity and surface tension of the liquid sample and solvents used. For example, if both the sample and the diluent are quite "thin" (i.e., the sample is a relatively dilute water or low-viscosity solvent solution and the diluent is a similar thin solvent), the diameter of aperture 112 and the lowermost channel 114 should be approximately 0.025 inch. For more viscous sample materials a probe having a larger diameter aperture (and larger diameter channel 114) should preferably be used: for example, for light lubricating oils a diameter of approximately 0.040 inch is suitable.

Although the sample probe of the invention is peculiarly advantageous when used in a liquid sampling system of the type in which a liquid sample is first sucked into the probe and then discharged by a fluid pushing the liquid sample out of the lower end of the probe, it should be obvious that this pushing fluid need not be a liquid diluent, or indeed a liquid at all. Thus it is perfectly practical, for example, to utilize the invention in conjunction with a wholly pneumatic sample delivery system (i.e., air or other gas suction and compression pumps) in which no sample dilution occurs. Other uses and changes of detail of the invention will be obvious to those skilled in the art, and all such analogous uses and minor modifications are intended to be included in the invention, except as specifically excluded by the scope of the appended claims.

I claim:
1. In a dispensing system of the type in which a liquid sample is delivered into a sample container through a sample probe, which probe is pivotally mounted for movement from a lower position substantially within said sample container to an angled upper retracted position, the improvement comprising:
   said sample probe comprising means defining a narrow channel communicating with the ultimate sample-dispensing probe tip;
   said sample-dispensing tip comprising means forming a small sample-dispensing aperture;
   the lowermost part of said channel defining means, forming the sample-dispensing portion of said narrow channel communicating with said sample-dispensing aperture of said probe, being of such construction that said sample-dispensing channel portion is substantially vertical when said probe is in its angled upper retracted position, and said sample-dispensing aperture is therefore substantially horizontal; and
   said lowermost part of said channel and said sample dispensing aperture being of such small diameter that the surface tension of the liquid being dispensed precludes dripping of said liquid.

2. A liquid sample dispensing system according to claim 1, in which:
   said lowermost part of said channel defining means is of such further construction that said sample dispensing channel portion is of substantially the same diameter as said sample-dispensing aperture for a vertical extent of said sample-dispensing channel portion equal in length to at least twice said aperture diameter.

3. A liquid sample-dispensing system according to claim 2, in which:
   said means defining said narrow channel is of such construction that said channel diminishes in diameter in a smooth gradual manner near the sample-dispensing portion thereof,
   whereby complete dispensing of the liquid sample in the lowermost part of the probe is insured when a fluid from the upper probe portion pushes said liquid sample through said sample-dispensing channel portion and out said aperture.

References Cited

UNITED STATES PATENTS

| | | | |
|---|---|---|---|
| 3,081,158 | 3/1963 | Winter | 73—423 |
| 3,202,188 | 8/1965 | Allington | 141—130 |
| 3,282,651 | 11/1966 | Ferrari et al. | 73—423 X |
| 718,801 | 1/1903 | Strauss | 222—422 |
| 2,789,734 | 4/1967 | Biederman | 222—420 X |

SAMUEL F. COLEMAN, Primary Examiner

N. L. STACK, Jr., Assistant Examiner

U.S. Cl. X.R.

222—571